United States Patent
Schatz

(10) Patent No.: US 10,354,062 B2
(45) Date of Patent: Jul. 16, 2019

(54) SYSTEM AND METHOD FOR SIMULTANEOUS FORENSIC, ACQUISITION, EXAMINATION AND ANALYSIS OF A COMPUTER READABLE MEDIUM AT WIRE SPEED

(71) Applicant: Schatz Forensic Pty Ltd, Brisbane (AU)

(72) Inventor: Bradley Schatz, Brisbane (AU)

(*) Notice: Subject to any disclaimer, the term of this patent is extended or adjusted under 35 U.S.C. 154(b) by 181 days.

(21) Appl. No.: 15/328,452

(22) PCT Filed: Jul. 22, 2015

(86) PCT No.: PCT/AU2015/050413
§ 371 (c)(1),
(2) Date: Jan. 23, 2017

(87) PCT Pub. No.: WO2016/011506
PCT Pub. Date: Jan. 28, 2016

(65) Prior Publication Data
US 2017/0213024 A1     Jul. 27, 2017

(30) Foreign Application Priority Data
Jul. 24, 2014  (AU) .................. 2014902866

(51) Int. Cl.
*G06F 21/50* (2013.01)
*G06F 21/00* (2013.01)
(Continued)

(52) U.S. Cl.
CPC .............. *G06F 21/50* (2013.01); *G06F 21/00* (2013.01); *G06F 21/645* (2013.01); *G06Q 50/18* (2013.01);
(Continued)

(58) Field of Classification Search
CPC ........ G06F 21/50; G06F 21/645; G06F 21/00; G06F 2221/034; G06Q 50/00
See application file for complete search history.

(56) References Cited

U.S. PATENT DOCUMENTS

| 6,792,545 B2 | 9/2004 | McCreight et al. |
| 7,899,882 B2 | 3/2011 | Shannon et al. |

(Continued)

FOREIGN PATENT DOCUMENTS

| WO | WO-2015166052 A1 * | 11/2015 | ............. G06F 21/64 |
| WO | WO-2016101005 A1 * | 6/2016 | ............. G06Q 50/18 |

OTHER PUBLICATIONS

Michael Cohen, Bradley Schatz, "Hash based disk imaging using AFF4", Digital Investigation vol. 7 Supplement, pp. S121-S128, Published by Elsevier Publishing, Aug. 2010.

*Primary Examiner* — Michael Pyzocha
(74) *Attorney, Agent, or Firm* — Martin IP Pty Ltd

(57) ABSTRACT

The present invention relates to a system for simultaneous forensic acquisition and analysis of data from a target data repository. The system comprises a source agent in communication with the target data repository. The source agent is incapable of writing to the target data repository and is configured to read a portion of the target data repository. The system further comprises an investigator computer having a processor configured to send at least one prioritized read command to the source agent to schedule a read of the target data repository based on a predetermined priority. A data sink is configured to store at least a partial forensic image of the target data repository based on the data read by said source agent.

20 Claims, 13 Drawing Sheets

(51) Int. Cl.
*G06F 21/64* (2013.01)
*G06Q 50/18* (2012.01)
*G06Q 50/26* (2012.01)

(52) U.S. Cl.
CPC ....... *G06Q 50/26* (2013.01); *G06F 2221/034* (2013.01)

(56) References Cited

U.S. PATENT DOCUMENTS

| | | | |
|---|---|---|---|
| 8,069,332 B2 * | 11/2011 | Choi | G06F 11/0715 711/151 |
| 8,171,108 B2 | 5/2012 | Shannon et al. | |
| 8,176,557 B2 | 5/2012 | Adelstein et al. | |
| 8,458,805 B2 | 6/2013 | Adelstein et al. | |
| 8,793,795 B1 | 7/2014 | Ravid | |
| 9,053,454 B2 * | 6/2015 | Mayer | G06Q 10/06 |
| 10,067,787 B2 * | 9/2018 | Bronner | G06F 9/4843 |
| 2004/0260733 A1 * | 12/2004 | Adelstein | H04L 63/123 |
| 2005/0193173 A1 * | 9/2005 | Ring | G06F 21/57 711/118 |
| 2006/0041936 A1 * | 2/2006 | Anderson | H04L 63/02 726/11 |
| 2008/0114926 A1 * | 5/2008 | Levi | G06F 13/1642 711/105 |
| 2008/0243955 A1 | 10/2008 | Anderson et al. | |
| 2008/0244034 A1 * | 10/2008 | Shannon | H04L 67/08 709/217 |
| 2009/0164522 A1 * | 6/2009 | Fahey | H04L 63/1441 |
| 2009/0288164 A1 * | 11/2009 | Adelstein | H04L 63/123 726/22 |
| 2010/0030786 A1 * | 2/2010 | McConnell | G06Q 10/06 707/706 |
| 2010/0299430 A1 * | 11/2010 | Powers | H04L 12/2809 709/224 |
| 2011/0173676 A1 * | 7/2011 | Peckover | G06F 21/6245 726/3 |
| 2012/0166456 A1 * | 6/2012 | Kim | G06F 17/30557 707/754 |
| 2012/0246435 A1 * | 9/2012 | Meir | G06F 13/00 711/169 |
| 2012/0290578 A1 * | 11/2012 | Morimoto | G06F 17/3061 707/737 |
| 2013/0073573 A1 * | 3/2013 | Huang | G06F 17/30563 707/755 |
| 2014/0115089 A1 * | 4/2014 | Maybee | G06F 17/30466 709/213 |
| 2014/0181975 A1 * | 6/2014 | Spernow | G06F 21/562 726/23 |
| 2014/0244522 A1 | 8/2014 | McCreight | |
| 2014/0244582 A1 | 8/2014 | Grier | |
| 2014/0244699 A1 * | 8/2014 | Grier | G06F 16/13 707/822 |
| 2014/0331322 A1 * | 11/2014 | Jaroch | H04L 63/1416 726/23 |
| 2015/0143053 A1 * | 5/2015 | Quimbey | G06F 12/0855 711/133 |
| 2015/0254109 A1 * | 9/2015 | Chandramouli | G06F 16/137 718/1 |
| 2016/0078240 A1 * | 3/2016 | Kang | G06F 21/64 726/31 |
| 2017/0024164 A1 * | 1/2017 | Yang | G06F 3/0652 |

* cited by examiner

Fig. 4

SYSTEM AND METHOD FOR SIMULTANEOUS FORENSIC, ACQUISITION, EXAMINATION AND ANALYSIS OF A COMPUTER READABLE MEDIUM AT WIRE SPEED

FIELD OF THE INVENTION

The present invention relates to systems and methods of conducting investigations of the information contained in computer storage mediums; particularly, on facilitating the forensic acquisition of computing devices while at the same time undertaking analytic tasks upon the evidence being acquired. One utility of this is in supporting expedited forensic investigations and electronic discovery.

BACKGROUND OF THE INVENTION

Both the fields of digital forensics and electronic discovery generally rely on a phased approach to preservation of evidential data; first the evidential data is "preserved" or "acquired", that is, a reasonably complete copy of the evidence is made, while preserving evidential integrity (minimising, or entirely preventing changes due to the operation of the acquisition technique on original target data storage device). Such activity is called by those versed in the art "forensic acquisition" and such a copy a "forensic image". A forensic image generally includes, along with the copied source data, a fingerprint (generally a cryptographic hash) of the source data, sufficient to detect any change in the copy. A forensic image is generally stored as a file or set of files known as an "Evidence Container". Following this, the forensic image may be either directly investigated using a range of examination techniques or processed using a range of Input-Output (IO) and compute intensive interpretation techniques supporting functions such as data recovery and search operations.

Traditionally, forensic images are complete copies of every storage block of a target device, and are acquired sequentially (linearly) from the first storage block to the last storage block on a device. Such an image is referred to as a "physical image", as it is a copy of the data in near physical form. Optionally the content of the image may be compressed in a manner that supports random access to image content. Such a forensic image is generally stored in a specific format of file or group of file, commonly referred to as an "Evidence Storage Container".

For example, traditional forensic practice is to power off the suspect system and physically remove permanent storage devices (e.g. Hard drives) for acquisition. The storage device is then attached to a computer by External Serial ATA (eSATA), Universal Serial Bus (USB3) or another high speed storage interface, in such a manner that writing is prevented to the storage device (keeping its integrity intact). The contents of the storage device are then read from beginning to end, while copying the contents of each block of data to another attached storage device (the destination). Such copying techniques are generally limited by maximum bandwidth of either the source or destination device.

Such a sequential acquisition technique is (assuming no bottleneck on output) the fastest method to produce a complete image, as reading from spinning disk hard drive storage is most efficient when read sequentially from the start address to end address. In 2014, commodity spinning platter (magnetic) drives may yield data at a rate of around 100-150 MB/s, and RAID arrays data rates of upwards of 300 MB/s. For such disks, non-sequential reads impose a latency penalty that can, in the worst cases, result in read rates in the realm of Kilobytes per second, slowing the ability to acquire and analyse by orders of magnitude. Acquisition of the Random Access Memory (RAM) of a computer produces data rates orders of magnitude more. Even at maximal read rates today's large drives take many hours to copy, deferring the ability to undertake analysis activities until the acquisition task is finished, and interrupting business operations in a significant way.

It follows that a significant challenge in the practice of forensics is the time lag between acquisition and the subsequent undertaking of analysis tasks, resulting in delays in understanding whether there is relevant evidence stored in a particular computing device.

The challenges with existing forensic approaches include: delays in analysing a digital environment; potential loss of evidence due to incomplete or absent preservation; and destruction of evidence.

It will be clearly understood that, if a prior art publication is referred to herein, this reference does not constitute an admission that the publication forms part of the common general knowledge in the art in Australia or in any other country.

SUMMARY

One or more embodiments of the present invention enable rapid forensic acquisition of the volatile or non-volatile memory (i.e., RAM, Disk or Flash) of a target computing device, or the non-volatile memory (i.e., Disk) removed from a target computing device, while enabling live analysis tasks to concurrently occur with minimal latency. The aforementioned types of memories are examples of a Target Data Repository.

In one preferred aspect, an embodiment of the present invention enables forensic acquisition, examination and analysis in parallel at wire speed, where the key limitations are the rate at which data is communicated and transformed. This depends on: the Target Data Repository's IO characteristics (bandwidth and latency); the location and quantity of suspect data required for "human in the loop examination"; the computational complexity of analysis tasks being applied; the power of the CPU; the amount of available RAM; and the outbound IO channels' IO characteristics (bandwidth, latency, and cryptographic security).

For example, for reads of target spinning platter hard disks, the limiting factors are latency induced by non-linear reads from the disk, and output channel bandwidth.

FIG. 2 summarises the fundamental operation of one aspect of an embodiment of the present invention, which is set forth below.

In step 701, a set of software components comprising the system are executed on the investigator's computer (Controller), a destination computer functioning as an acquisition container (Sink), where the forensic image is generally stored, and on a target (Source) computer, where the target storage of evidential value (the Target Data Repository) is located. The set of software components establish a communications link.

In step 702, a storage device is attached to the system (generally the Sink Computer), and configured to act as a storage destination for forensic acquisition.

With reference to FIG. 2, the investigator employs the Controller GUI (see FIG. 4) to cause an acquisition to occur (see FIG. 5), specifying in step 703 the Target Data Repository on the source device, the destination of the image, the scope of the acquisition operation, the integrity maintenance features used (hashing), and compression algorithm.

This causes in step 779 the Scheduler/Interpreter, which in this instance is located within the Source, to satisfy evidence goals (which meet the scope specified by the investigator) and to continually plan a prioritised path in step 771 for reading the contents of the storage device, the path being optimised to maximise the read bandwidth of the storage device. Blocks are read by the Source and Evidence Goal related actions undertaken in step 780 on the blocks, which are communicated to the Sink, where they are stored in step 772 in the Sink Device in a Partial Forensic Image in arbitrary order. During the acquisition, the Investigator may modify in step 773 the scope of the acquisition, causing further Evidence Goals to be sent to the Interpreter/Scheduler in step 774.

During acquisition, the investigator may cause the Controller (see FIG. 4, the icon next to the X) to share the partial image as a virtual disk in step 705, such that forensic tools might perform operations on the virtual disk, thus enabling examination or analysis to concurrently occur. In step 770, reads from the virtual disk are transformed to Block Match Queries for low level blocks of the image, and tagged with a Priority Tag of highest priority (Immediate Priority) and sent to the Sink. If the block queried for is in the Partial Forensic Image, then the corresponding block (and potentially surrounding blocks) read in step 775 from the forensic image and sent back to the Controller, and onwards used to satisfy in step 776 the virtual disk read. If the block requested is not in the Partial Forensic Image, then the Block Match Query is passed onwards in step 777 to the Source, where it is given priority for scheduling reads from the disk. On the read of the block from the source disk, the block is transferred back to the Sink, where it is both stored in the image in step 772 and sent back to the Controller where it is used to satisfy in step 778 the virtual disk read.

At any time the investigator may finalise in step 707 the Partial Forensic Image, which causes the Source to stop listening for queries and stop sending data blocks, and causes the Sink to save the image in a consistent state, including a cryptographic hash of the stream of evidential blocks read.

Methods and systems of one or more embodiments of the present invention enable investigations to scale locally. For example, in acquiring and analysing a network of 100 computers located within the same building and all sharing the same network with a per link throughput of 1 GiB/s, a practitioner might scale acquisition and analysis with the system by utilising a direct attached output storage device for computers with sufficient output bandwidth (i.e. those with USB3 connections), via the network to a separate acquisition specific computer with attached storage, or by utilising multiple output channels (such as via two gigabit Ethernet ports on a server). Regardless of the IO channels chosen, examination and analysis activities may continue in parallel with real-time examination related data streamed to the examiner's controlling computer via the network.

Methods and systems of one or more embodiments of the present invention enable investigations to proceed rapidly in cloud computing environments. For example, in acquiring and analysing a virtual computer or computers in a cloud environment, analysis may scale by provisioning a destination virtual server as an acquisition evidence container (Sink), with the evidence container stored on connected cloud storage within the same data centre. Such topologies (see FIG. 7) take advantage of high throughput network links within the data centre, expediting the completion of acquisition. Methods and systems of the invention additionally address related challenges such as service provider imposed rate limiting and bandwidth capping, and reliability and throughput issues inherent in transferring large data streams over long distance links. Live examination related information is streamed to the Investigator's computer, and should it be desired, the Partial Forensic Image (possibly a Complete Forensic Image after acquisition is complete) may be copied via Wide Area Network (for example the Internet) to the Investigator's computer. Alternatively, the destination sink device may be located locally on the same network as the operator (see FIG. 6).

Methods and systems of one or more embodiments of the present invention are able to scale beyond that of the physical maximum throughput rates of individual IO channels by using symbolic and compressed data representations rather than raw data, and by aggregating the available output bandwidth by storing the image across multiple storage devices at once. The digital evidence storage container stores native versions of the symbolic and compressed data representations, such that reads of those objects may be transferred efficiently across the network.

In one preferred aspect, the present invention is directed to system for simultaneous forensic acquisition and analysis of data from a target data repository. The system includes a source agent in operative communication with the target data repository, the source agent being incapable of writing to the target data repository, the source agent being configured to read a portion of the target data repository. The system also includes an investigator computer having a processor configured to send at least one prioritised read command to the source agent to schedule a read of the target data repository based on a predetermined priority. The system further includes a data sink configured to store at least a partial forensic image of the target data repository based on the data read by the source agent.

In another preferred aspect, the present invention is directed to a method for forensically analysing data during a data acquisition from a target data repository. The method includes: reading data, with a source agent, from the target data repository to a data sink to assemble a partial forensic image of the target data repository; submitting at least one prioritised read command to the source agent, the prioritised read command including a read command that is prioritised based on a pre-configured priority; scheduling, with the source agent, a data read from the target data repository based on the prioritised read command; reading data, with the source agent, from the target data repository based on the prioritised read command to the data sink; and permitting analysis of the data procured by the prioritised read command while further data is read from the target data repository.

In a further preferred aspect, the present invention is directed to a method for forensically analysing data during a data acquisition from a target data repository. The method includes: reading data, with a source agent, from the target data repository to a data sink to assemble a partial forensic image of the target data repository; submitting at least one prioritised read command to a sink agent operatively connected to the data sink, the prioritised read command specifying a subset of data thought to be contained in the target data repository; reading, with the sink agent, the subset of data from the data sink if the requested subset of data is in the data sink, otherwise forwarding the prioritised read command to the source agent to obtain the requested subset of data.

It is to be understood that both the foregoing general description and the following detailed description are exemplary and explanatory only and are not restrictive of the invention, as claimed. In the present specification and claims, the word "comprising" and its derivatives including "comprises" and "comprise" include each of the stated integers, but does not exclude the inclusion of one or more further integers.

The claims as filed and attached with this specification are hereby incorporated by reference into the text of the present description.

The accompanying drawings, which are incorporated in and constitute a part of this specification, illustrate several embodiments of the invention and together with the description, serve to explain the principles of the invention.

BRIEF DESCRIPTION OF THE FIGURES

Figure 4:
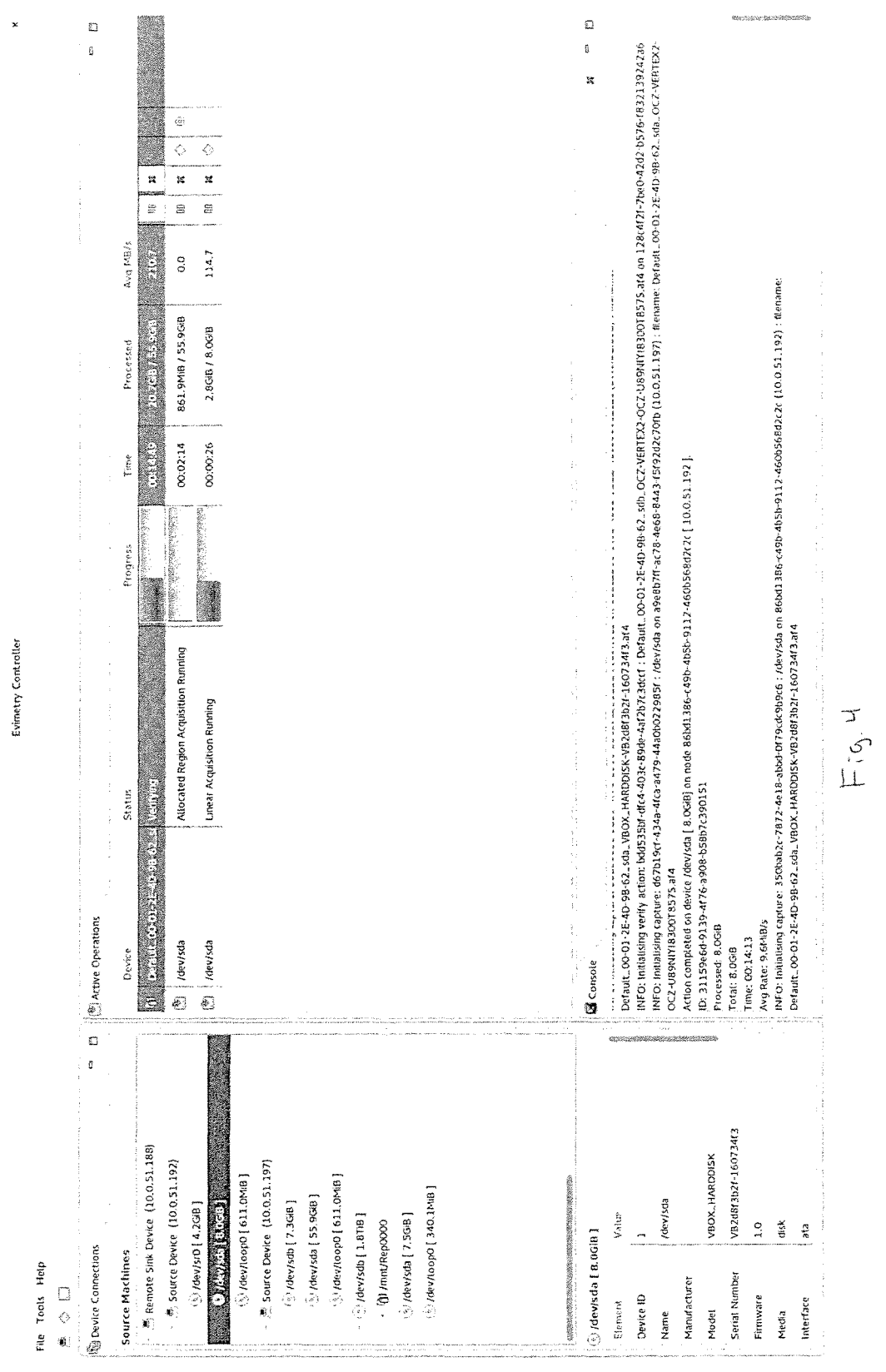

FIG. 4 is a screen capture of a user interface of a controller in accordance with an embodiment of the present invention.

DETAILED DESCRIPTION OF THE DRAWINGS

Reference will now be made in detail to the present preferred embodiments of the invention, examples of which are illustrated in the accompanying drawings.

Figure 1:
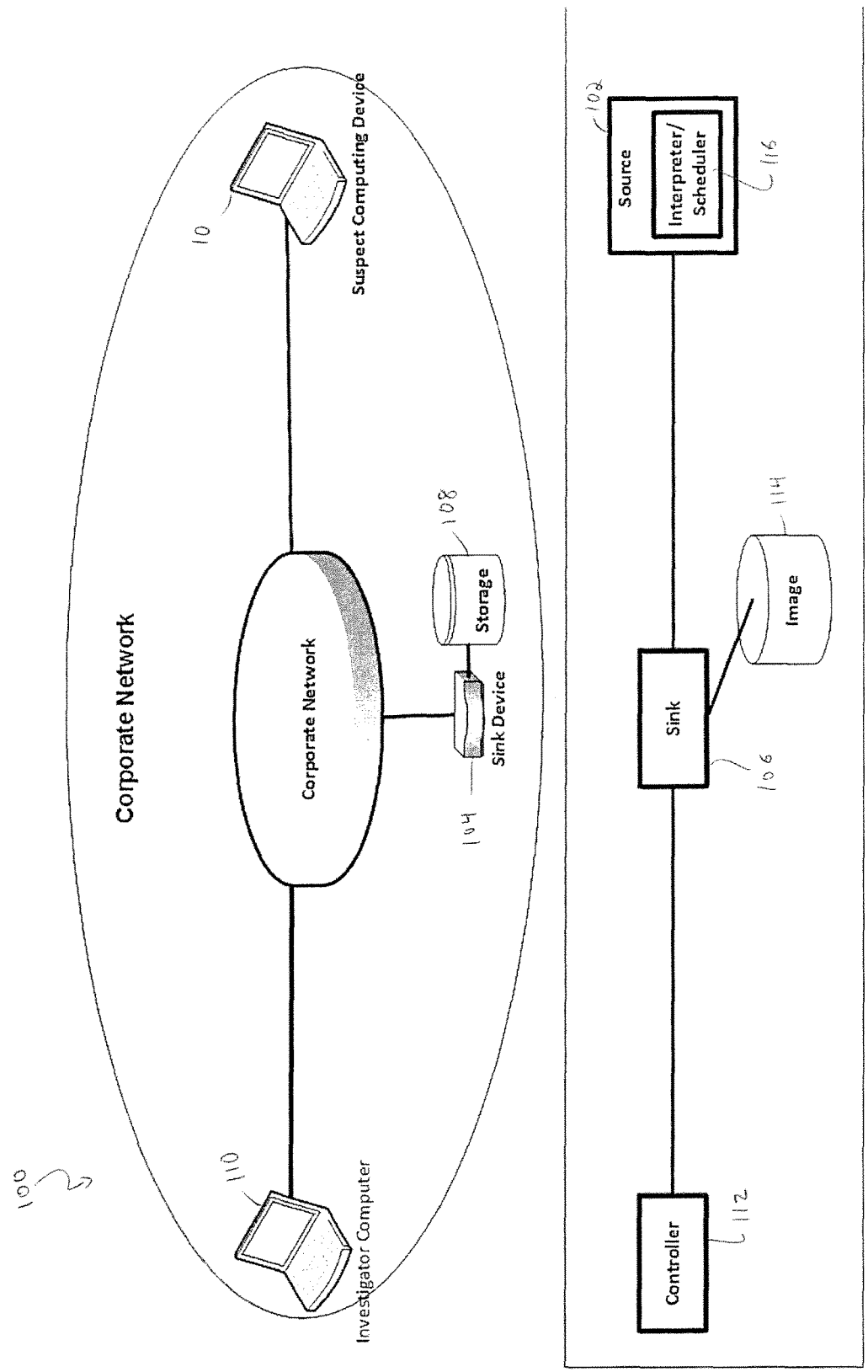
FIG. 1 is a diagrammatic view of a system for forensic capture and analysis in accordance with one embodiment of the present invention.
Figure 2:
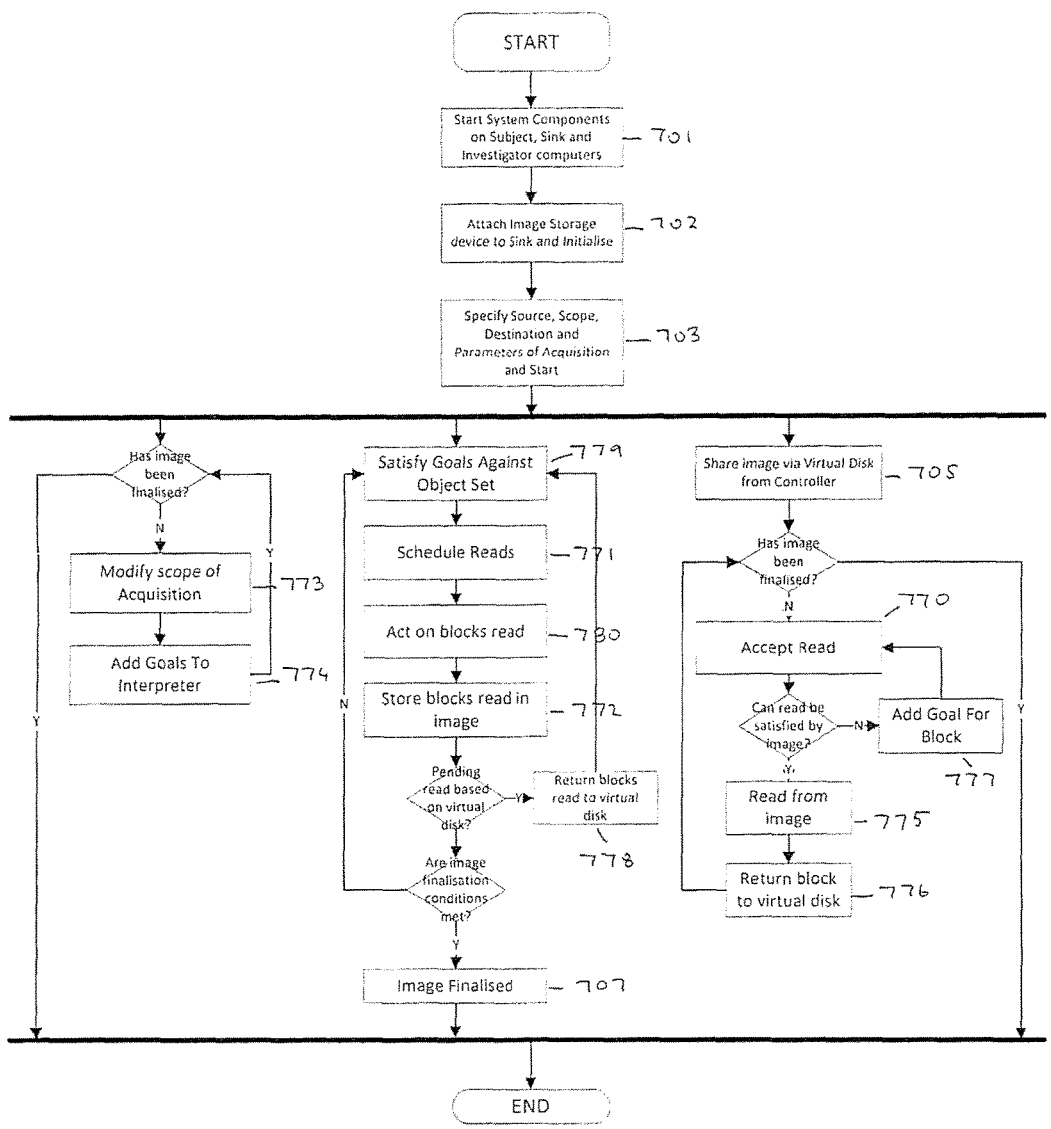
FIG. 2 is a diagram of a method for finalising a forensic image in accordance with an embodiment of the present invention.

FIG. 1 depicts a system 100 where a Source software Agent 102 is executed on a Target corporate computing device 10 (such as a laptop or sever). Source Agent 102 is executed by an investigator either by running the agent using the target computer's operating system, or by rebooting computer 10 into an independent live operating system executed from a USB storage device or CD. Source Agent 102 provides no means to write to the raw storage devices it accesses.

Source Agent 102 establishes a communications link using a communications protocol to a second computer referred to as a Sink Device 104 located on the same Local Area Network. Sink Device 104 is deployed by the investigator as a destination for forensic acquisition. Sink Device 104 has executing on it software called a Sink Agent 106, which, on execution identifies attached storage devices 108.

The investigator connects a third computer 110, for example a laptop, to the same network, and executes a piece of software referred to as a Controller 112. The controller 112 automatically discovers Sink device 104 and establishes a secure connection. Controller device 112 queries for the storage devices attached to Sink device 104. Sink 104 responds with details related to the attached storage device and the connected Source Agent 102 running on target computer 10. The Partial Forensic Image 114 is saved to a disk 108 directly attached to Sink computer 104, using for example eSATA or USB3 as an interface.

The investigator then elects to acquire the entirety or a subset of a storage device within or attached to Target device 10, with the destination being the storage device attached to Sink 104. The subset may be just the live files on the storage device, filesystem and volume metadata, specific files, or other. This specification is expressed as a set of Evidence Goals which is sent to the source.

Controller 112 then issues a start message, which causes the source to begin a process of scheduling reads of Target Data Repository 10 based on the initial query. In general, high level queries will require further information in order to determine which blocks of Target Data Repository 10 to read. For example, if the query was for all live files stored on the storage medium, successive computations and reads from the storage device would be required, first to identify the segments of the hard drive used for storing file systems (partitioning or volumes) and secondly to identify within those file systems where the content of each file resides. One exemplary implementation of an embodiment of the invention contains an independent implementation of the MS Windows New Technology File System (NTFS), the MSDOS File Allocation Table (FAT) Filesystem, and Linux Extended Filesystem (EXT4 & EXT4) and filesystems used by a wide range of computing devices. A scheduling component 116 takes a queue of blocks to be read and prioritises reading those blocks from Target Data Repository 10.

Blocks read are transformed (using data compression or symbolic compression) and sent to Sink Agent 106. On read of the block from Target Data Repository 10, the block is transformed (compressed or symbolic) into a space efficient data representation, encoded into a corresponding network protocol representation, and sent to sink 104. On receipt of the compressed blocks, Sink 104 continually saves the blocks into an out of order Partial Forensic Image 114.

While the above acquisition is underway, the analyst might choose to remotely examine the evidence. In order to do this, the investigator causes a virtual disk to be created on investigator computer 110, and applies a forensic analysis tool to the virtual disk. Requests for blocks of the virtual disk result in messages (Block Match Queries) for blocks to be sent to sink 104, where Partial Forensic Image 114 is located. Where Partial Forensic Image 114 contains the block being queried for, a space efficient data representation containing the requested address is read from the Partial Forensic Image, converted into a network protocol representation and sent back to investigator computer 110, where it is transformed into a raw data block and used to respond to the corresponding virtual block request.

If the block is not in Partial Forensic Image 114, the request is passed to target computer 10, where it is passed to scheduler 116 with highest priority, thus going to the head of the queue for reading. On receipt by sink 104 the space efficient data representation is written to Partial Forensic Image 114 and forwarded to investigator computer 110, where it is transformed into a raw data block and used to respond to the corresponding virtual block request.

Primary functional software components of the system include:

Source: reads target evidence storage devices, transforms read data into efficient forms for communication and storage (Evidence Data Objects);

Sink: stores Evidence Objects in Evidence Containers;

Scheduler/Interpreter: plans efficient read access, interprets Evidence Goals, satisfies queries, applies analysis techniques; and Controller: orchestrates acquisition and analysis activities over a range of target computers and Target Data Repositories, storage of acquired evidence in evidence containers, and efficient access of evidential data via virtual disk.

It will be appreciated that the system may be configured in a variety of ways without departing from the scope of the present invention. For example only, FIGS. 6-10 illustrate alternative embodiments within the scope of the present invention.

Figure 6:
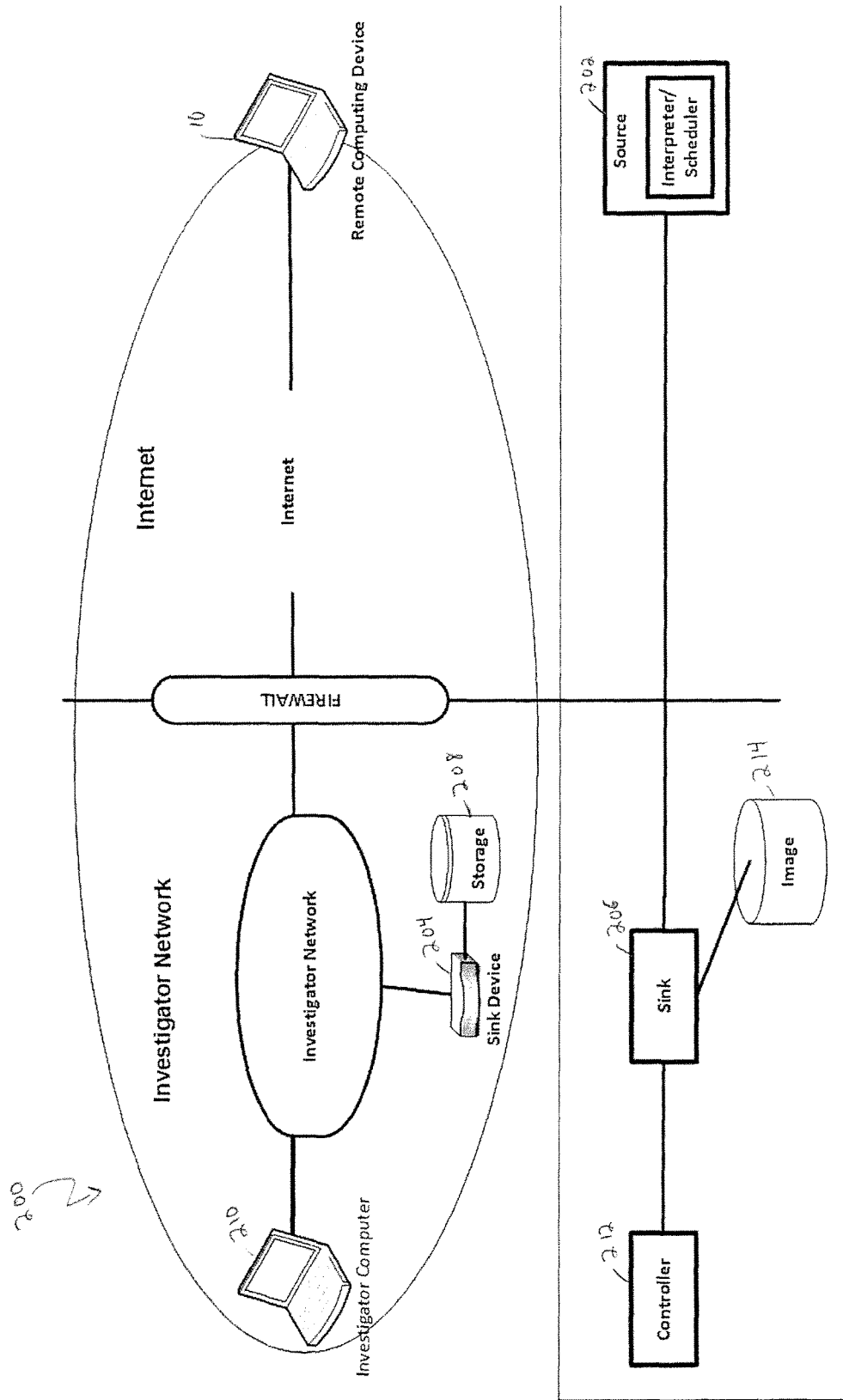
FIG. 6 is a diagrammatic view of a system for forensic capture and analysis in accordance with another preferred embodiment of the present invention.

FIG. 6 depicts a system 200 where Source software Agent 202 is executed on a remote computer 10, Sink Agent 206 on a dedicated sink computer 204 located local to the investigator, who operates the Controller GUI 212 on a computer 210 (e.g. a laptop). A Partial Forensic Image 214 is saved to a storage disk 208 directly attached to the sink computer, using for example eSATA or USB as an interface.

Figure 7:
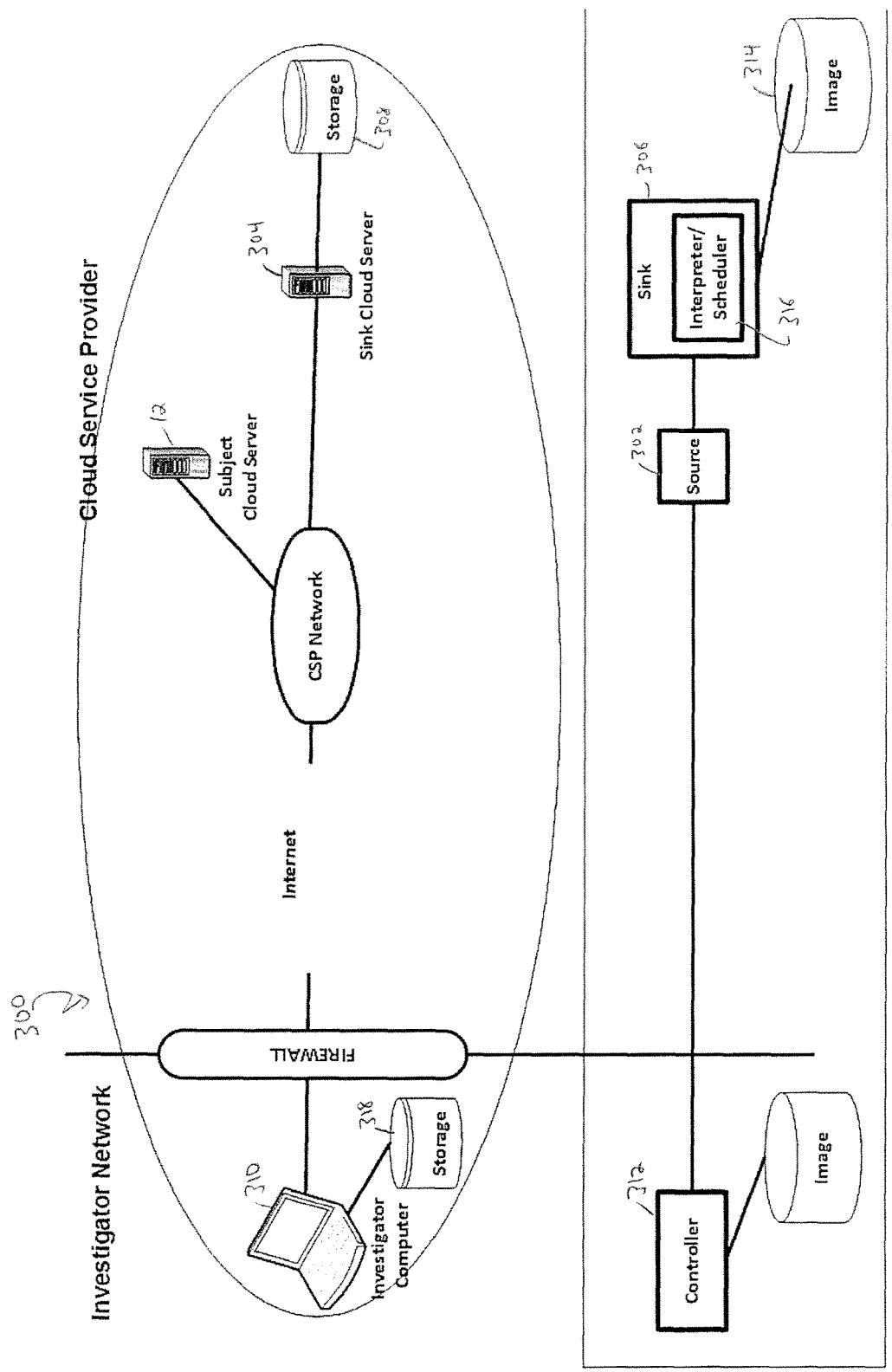
FIG. 7 is a diagrammatic view of a system for forensic capture and analysis in accordance with a further preferred embodiment of the present invention.

FIG. 7 depicts a system 300 where Source software Agent 302 is executed on a cloud server 12, Sink Agent 306 on a collocated cloud server 304 proximal to Source cloud server 12, and the investigator, who operates the Controller GUI 312 on a computer 310, is located across the internet.

Unlike other depicted topologies, Scheduler/Interpreter 316 is located in Sink 306 in this instance, due to the potential of limited RAM resources in the Target Cloud Server. In this way, RAM expensive operations such as Object Based Acquisition may take advantage of greater RAM resources found in the Sink Server, the resources of which are configurable due to it being created specifically for acquisition.

Partial Forensic Image 314 is saved in the first instance to a cloud storage disk 308 directly attached to cloud sink server 304. In this manner acquisition potentially rapidly proceeds via high speed 10 GbE LAN connection within the cloud service provider, and the speed of acquisition does not suffer from limited cross-internet bandwidth. A secondary sink agent on the investigator's computer is connected to a directly attached storage disk 318, using for example eSATA or USB as an interface. Copying of image 314 from cloud Sink storage 308 to local Sink storage 318 may proceed at a different rate than acquisition of the remote image.

Figure 8:
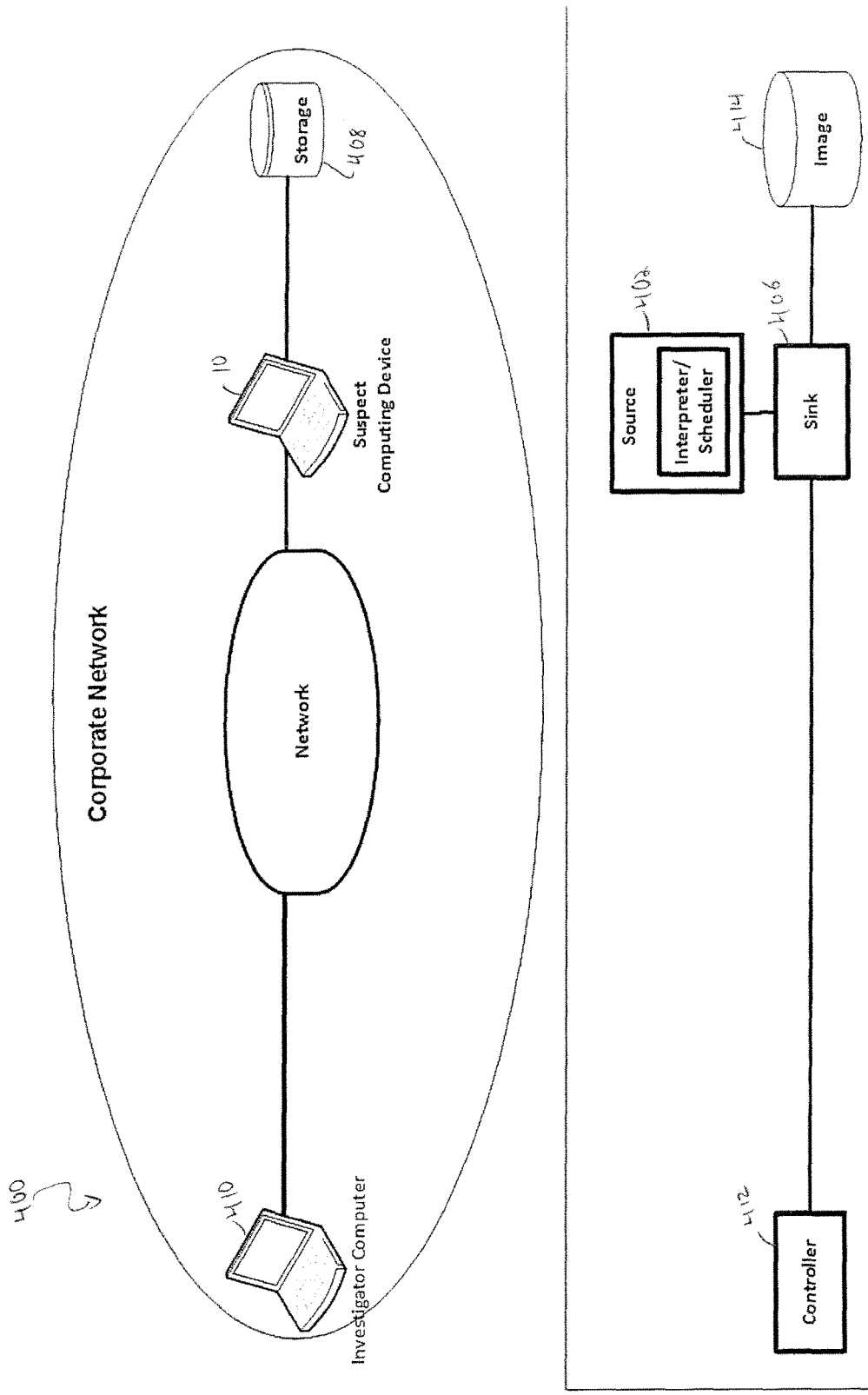
FIG. 8 is a diagrammatic view of a system for forensic capture and analysis in accordance with yet another preferred embodiment of the present invention.

FIG. 8 depicts a system 400 where Source software Agent 402 and Sink software Agent 406 are executed on a corporate workstation computer or server 10, while the investigator operates the Controller GUI 412 on a computer 410 attached to the corporate network. Partial Forensic Image 414 is saved to a storage disk 408 directly attached to the corporate computer, using for example eSATA or USB3 as an interface.

Figure 9:
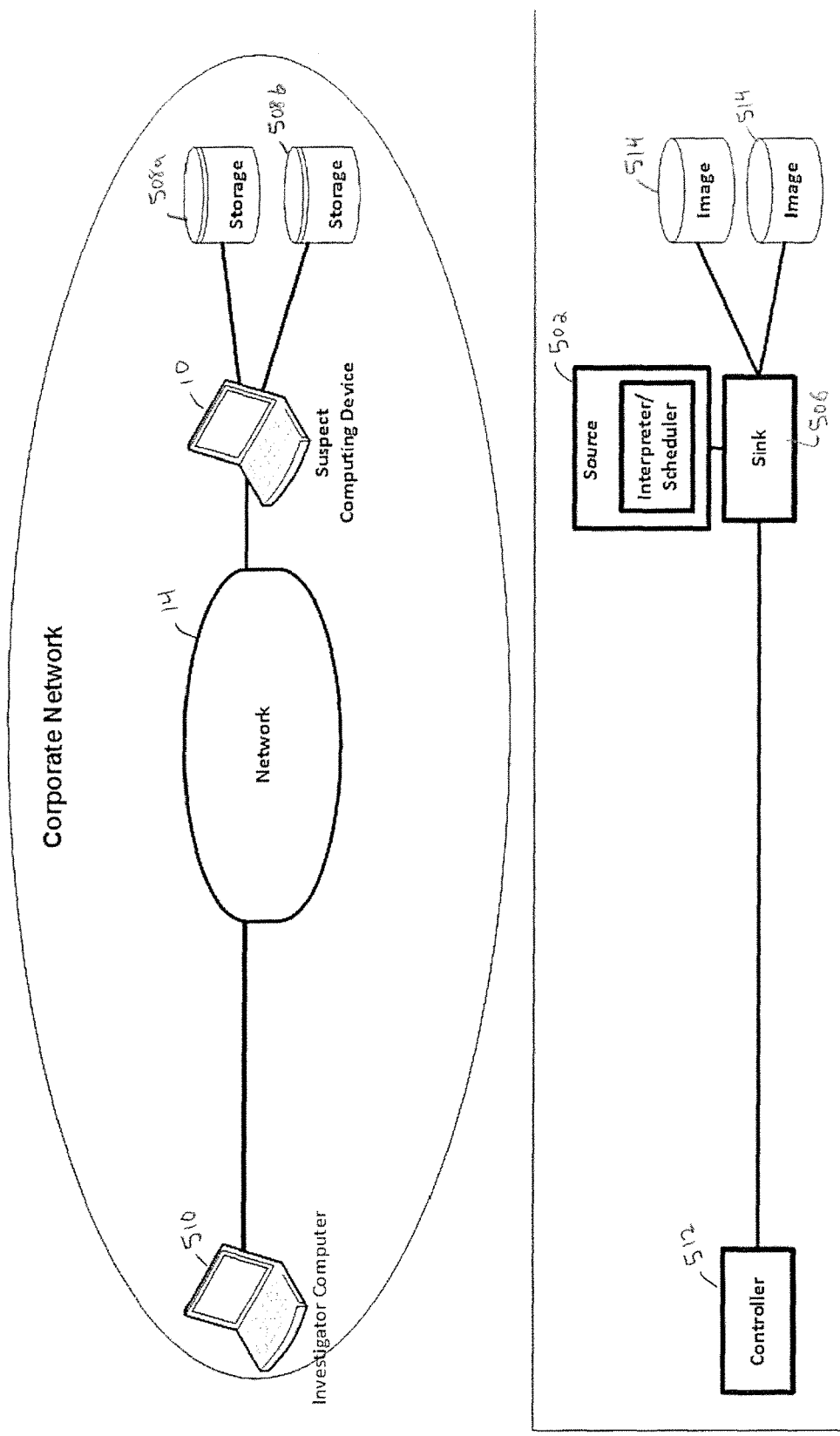
FIG. 9 is a diagrammatic view of a system for forensic capture and analysis in accordance with an additional preferred embodiment of the present invention.

FIG. 9 depicts a system 500 where Source software Agent 502 and Sink software Agent 506 are executed on a corporate workstation computer or server 10, while the investigator operates the Controller GUI 512 on a computer 510 attached to the corporate network 14. Forensic Image 514 is saved in parallel to a number of storage devices 508a, 508b directly attached to corporate computer 10, using for example eSATA and USB as interfaces.

Figure 10:
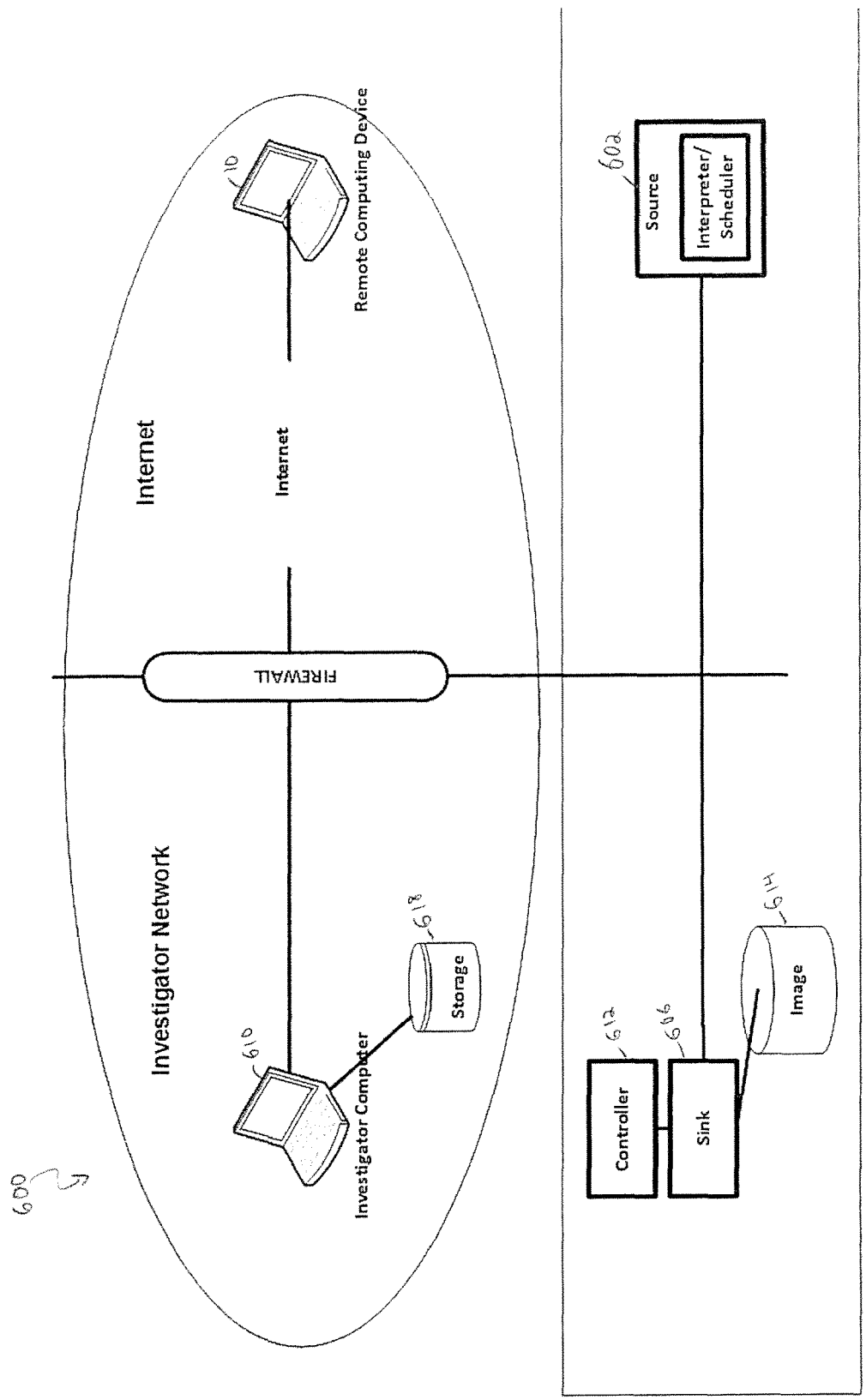
FIG. 10 is a diagrammatic view of a system for forensic capture and analysis in accordance with a further preferred embodiment of the present invention.

FIG. 10 depicts a system 600 where Source software Agent 602 is executed on a remote workstation 10, and both Sink Agent 606 and the investigator Controller GUI 612 are located on investigator's computer 610. Forensic Image 614 is saved to a disk 618 directly attached to investigator computer 610, using for example eSATA or USB as an interface.

Having described various system components, a method of their interactions will now be described.

In order to specify the scope of the acquisition, one needs a way of describing what areas of the Target Data Repository are to be acquired. Traditional linear (complete) images generally treated this implicitly. Two approaches may be used to do this: Address/length based methods; and Abstract methods. For simplicity, these are termed "Evidence Goals".

The latter area is useful for identifying areas of the disk that require further information to be read from the disk and interpreted to specifically identify, which requires some elements of actions (computations) that are required.

These Evidence Goals include: Block Match Queries; and Object Match Query→Action rules.

Evidence Goals in the current embodiment have two subtypes: Object Matching Query->Action Rules and Block Match Queries. Block Match Queries are used for identifying a particular range of bytes in the source storage device by offset and length or by offset modulus block size and length. Object Match Query types range from Queries that match without limit, Image, Volume, File, Folder, File Type (for example executable), File Name and File Content. Additionally Queries may be composed together using Boolean logic operators AND and OR.

Evidence Objects have two sub-categories: Evidence Data Objects and Evidence Interpretation Objects. Evidence Data Objects contain information sufficient to identify the source of the evidence object as an offset into its associated Storage Device, and a length. There are four types of Evidence Data Objects: Raw Evidence Objects, Compressed Evidence Objects, Byte Symbolic Evidence Objects and Hash Symbolic Evidence Objects. Raw Evidence Objects contain a byte sequence containing a copy of the exact bytes read from the source device. Compressed Evidence Objects contain a byte sequence which is a compressed version of the original bytes read from the source device. Additionally such an object identifies the compression algorithm used to compress the data. In the current embodiment of the invention we support the algorithms Snappy, LZ4, Inflate, and no compression. A Byte Symbolic Evidence Object represents a byte sequence where each byte has the same constant value. Hash Symbolic Evidence Objects contain a sequence of bytes corresponding to the hash of the original bytes read from the source device, and an identifier of the hash algorithm used. Evidence Interpretation Objects are used to represent and record the results of interpretations of analysis actions against parts of the evidence. For example, Hash Value Objects contain an object identifier, the hash value and hash algorithm associated with a particular object found within the evidence, such as the MD5 hash of a stream of a file.

Network communication between Source, Sink and Controller components share a common protocol built on top of a stream based network connection. In a preferred embodiment the base stream based protocol is by default the commodity Transport Layer Security (TLS) protocol over the TCP/IP protocol, however this could be DTLS over UDT, or any other stream based protocol.

The protocol contains a range of features used for resource discovery, authentication, and others, however the portion of the protocol pertinent to the following is the part of the protocol related to the acquisition of a single storage device image.

Figure 13:
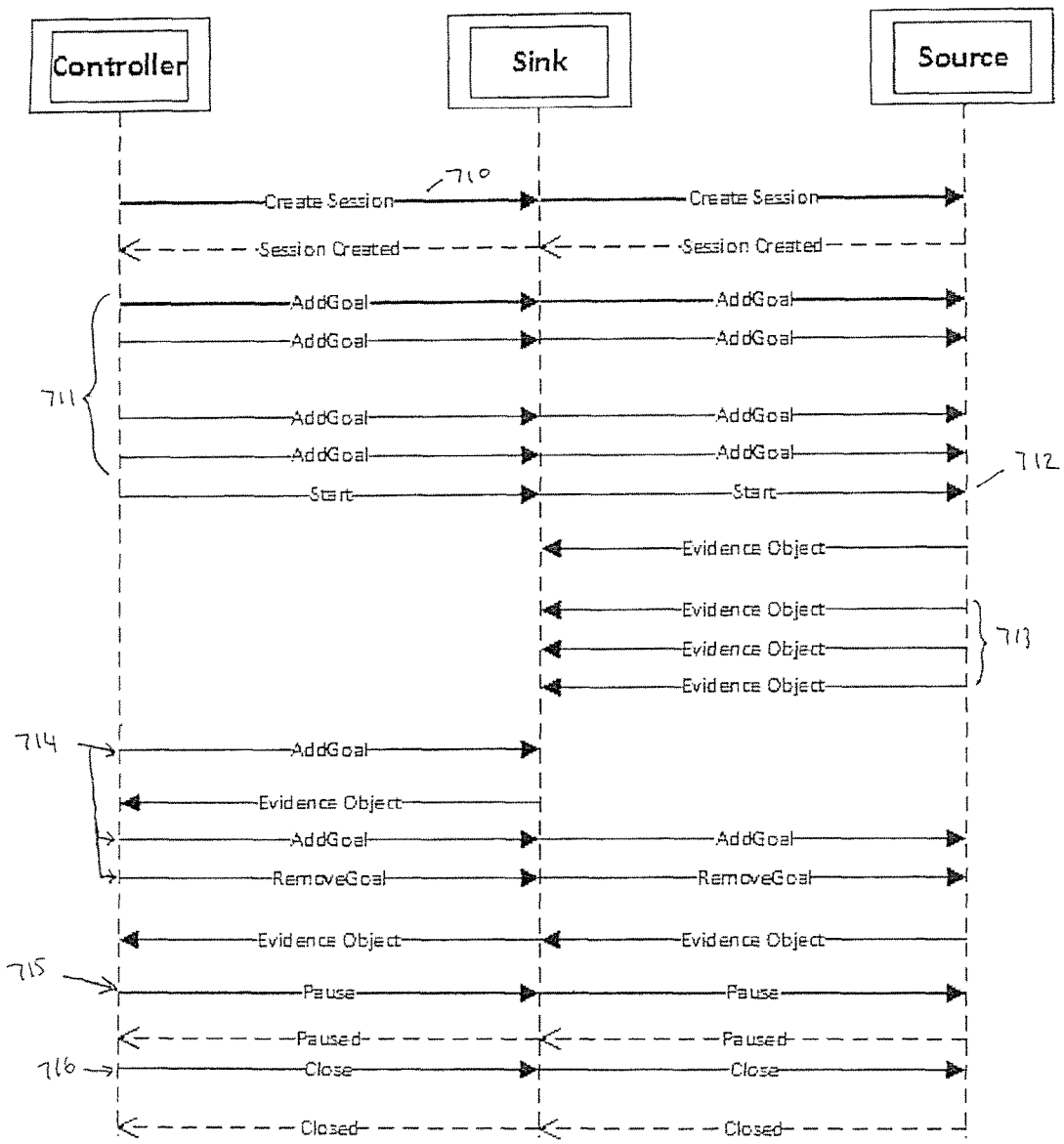
FIG. 13 shows an exemplary series of actions between the controller, sink and source of FIG. 1.

With reference to FIG. 13, the relevant aspects of the protocol include: in step 710, an acquisition session is created by sending a new acquisition session message from the controller to the source via the sink. A unique identifier is associated with this session. In steps 711, series of Goals describing the acquisition task are added to the Source via the Sink. In step 712, acquisition is started by sending a Start message. The Interpreter/Scheduler in the Source start executing the read sequence prioritised acquisition process. In steps 713, Evidence Objects resulting from the action of the Interpreter/Scheduler are fed into a pipeline where they are compressed, hashed and then encoded into their network representation and streamed to the Sink. While the session is active, the controller may submit further Goals to the Sink in steps 714. While the session is active, the controller may remove queries from the Source via the Sink.

Further to steps 714, if the Sink can satisfy the Goal from the associated Evidence Container, the corresponding Evidence Object is read from the Evidence Container, encoded into its network representation and streamed to the Controller.

Further to steps 714, if the Sink cannot satisfy the Goal from the associated Evidence Container, the query is sent onwards to the Source. On receipt of an Evidence Object matching the query, in addition to storing the Evidence Object, the Sink sends the Evidence Object onwards to the Controller.

During Interpreter/Scheduler execution, the session may be paused, which halts scheduling and reading at the source for the session in step 715.

During Interpreter/Scheduler execution, the paused session may be resumed, which resumes scheduling and reading at the source for the session.

When all goals have been satisfied and there is no more work to be done by the Scheduler/Interpreter and associated Evidence Objects or Result Objects streamed back to the Sink, the session is kept open such that more Goals may be issued to the Source.

To close the session, the Controller sends a Close message in step 716 to the Sink and onwards to the Source, which causes the Source and Scheduler to cease causing further reads, waits for in-flight reads to complete, sends those reads to the Sink, and closes the Target Data Repository.

The Evidence Container is then closed and finalised.

A Controller Agent GUI runs on a computer system which can communicate with a Sink Agent, and is the source of Evidence Goals. The Controller Agent may either automatically or by providing an address allow the operator to access a multitude of evidential Source Devices, evidential Sink Devices and attached to those, evidence Storage Devices.

The Controller Agent may be used to send Evidence Goals to Sink Agents and Source Agents.

The controller agent may cause a virtual disk to be shared (e.g. via iSCSI), and associated with a particular Partial Forensic Image. In one embodiment, a virtual hard drive is provided by exporting a representation of the Partial Forensic Image via the iSCSI protocol. In response to iSCSI protocol requests, Block Match Queries with a Priority Tag of "Immediate" (highest priority) are generated and communicated to the Evidence Sink associated with the Partial Forensic Image for satisfaction at highest priority. Evidence Data Objects are returned in response to those queries and used to satisfy the iSCSI block requests.

A Source Agent is a software agent which runs on a computer system that contains evidential storage devices such as RAM, Hard Drives, etc. It listens for a stream of Evidence Goals and passes a stream of Evidence Objects to an attached Sink Agent. The Source Agent preserves the integrity of the Target Data Repositories by not having the capacity to write to those devices.

The Scheduler/Interpreter is fed Evidence Goals and undertakes read-sequence prioritised acquisition by user defined goals and available computing resources (further described below). It is generally located on the Source, but may be located on the Sink.

Evidence Objects are streamed from the Source Agent to the Sink Agent, which is capable of assembling an out of order Partial Forensic Image from the contents of the Evidence Objects, without requiring any data transformation operations (i.e., decompression and recompression). The Partial Forensic Image is stored in one or more evidence containers on locally attached storage devices attached to that Sink Agent or remotely connected via subordinate Sink Agents.

A Sink Agent is generally a software agent which runs on a computer system on which attached storage devices are used to store copies of evidence. This could be the same computing system that a source agent runs on or a separate computer. The Sink Agent listens for messages from the Controller Agent, passes on Evidence Goal messages to the Source Agent, stores streams of Evidence Objects in evidence containers in such a manner to support resumable and multi-destination forensic acquisition (described in further detail below). The sink may additionally respond to Evidence Goals with evidence objects stored in an attached evidence container or containers.

Where the agents are situated on separate computing devices and are communicating over a network, the agents are capable of establishing cryptographically secure mutually authenticated channels for communication (currently TLS over TCP/IP).

In addition to Evidence Goals and Evidence Objects, other messages which flow in the system include messages related to tracking progress of a set of goals, such that operators may perceive aspects of acquisition such as the rate of data flow, the amount of time left until completion, the size of the data set being acquired, etc.

On startup or on receipt of a Survey Goal, a Source Agent surveys attached storage devices for size, discontinuities, and other properties. The investigator, by operation of the Controller, causes a set of Goals to be passed to the Scheduler/Interpreter. Current high level acquisition activities supported by the Controller GUI are undertaken by specifying Goals expressing the following, using the current embodiment: the entire storage device; all allocated space in the storage device; key file subsets (swap/pagefile, logs, registry); swap volumes; file types based on file extensions; and file objects within folder hierarchies Which goals the investigator sends may depend on the time pressures and scope of the engagement and the perceived value of particular classes of evidence.

For one example, an investigator may choose to cause a partial acquisition of a hard drive in the target computer, the initial scope of which being the system logs, registry and the swapfile. Setting this acquisition scope in the controller, ultimately results in an Evidence Goal request being sent to the Source Agent, the goal containing a Query/Action rule for system log file content, a Query/Action rule for Registry file content, and a Query/Action rule for swapfile content, and a set of default Query/Action rules. A Task is a special type of Action.

Figure 3:
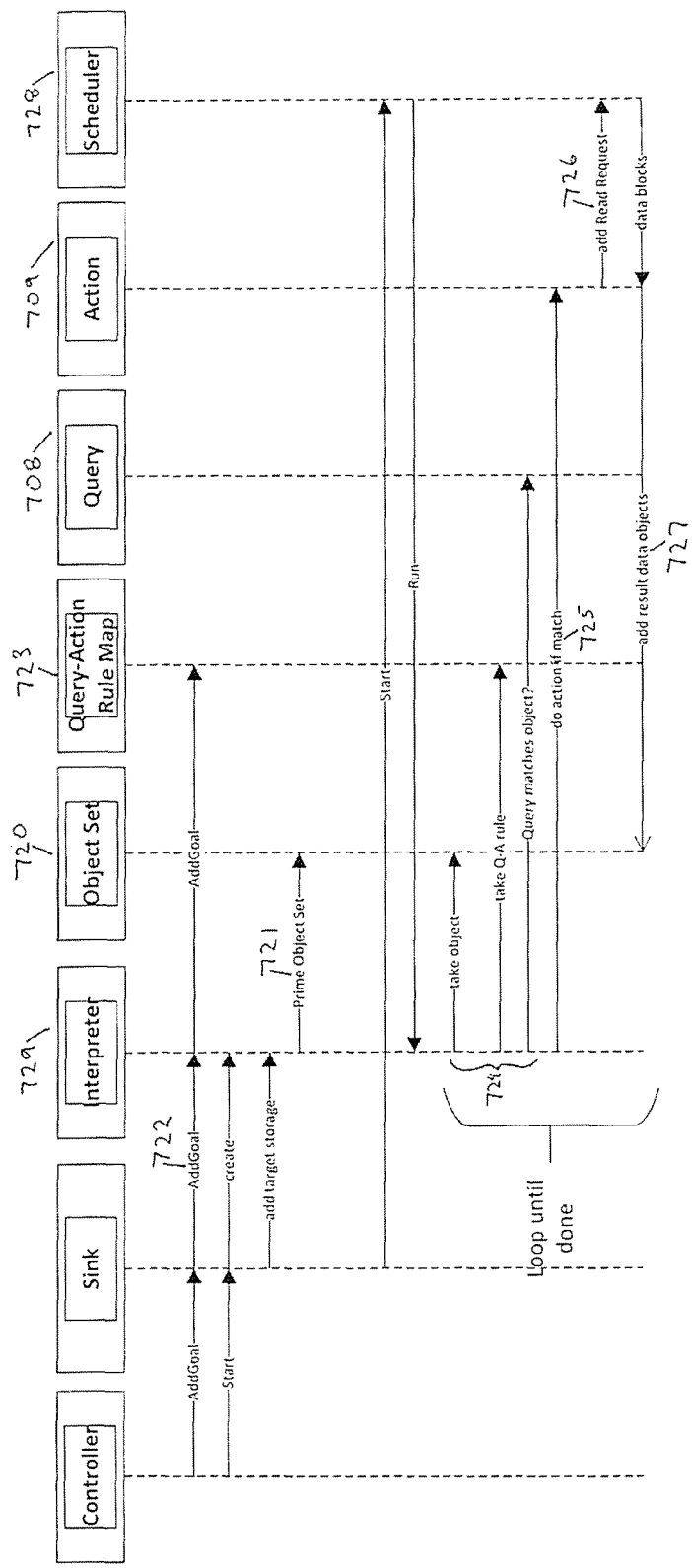
FIG. 3 is a diagrammatic view illustrating an exemplary use of an embodiment of the present invention.
Figure 5:
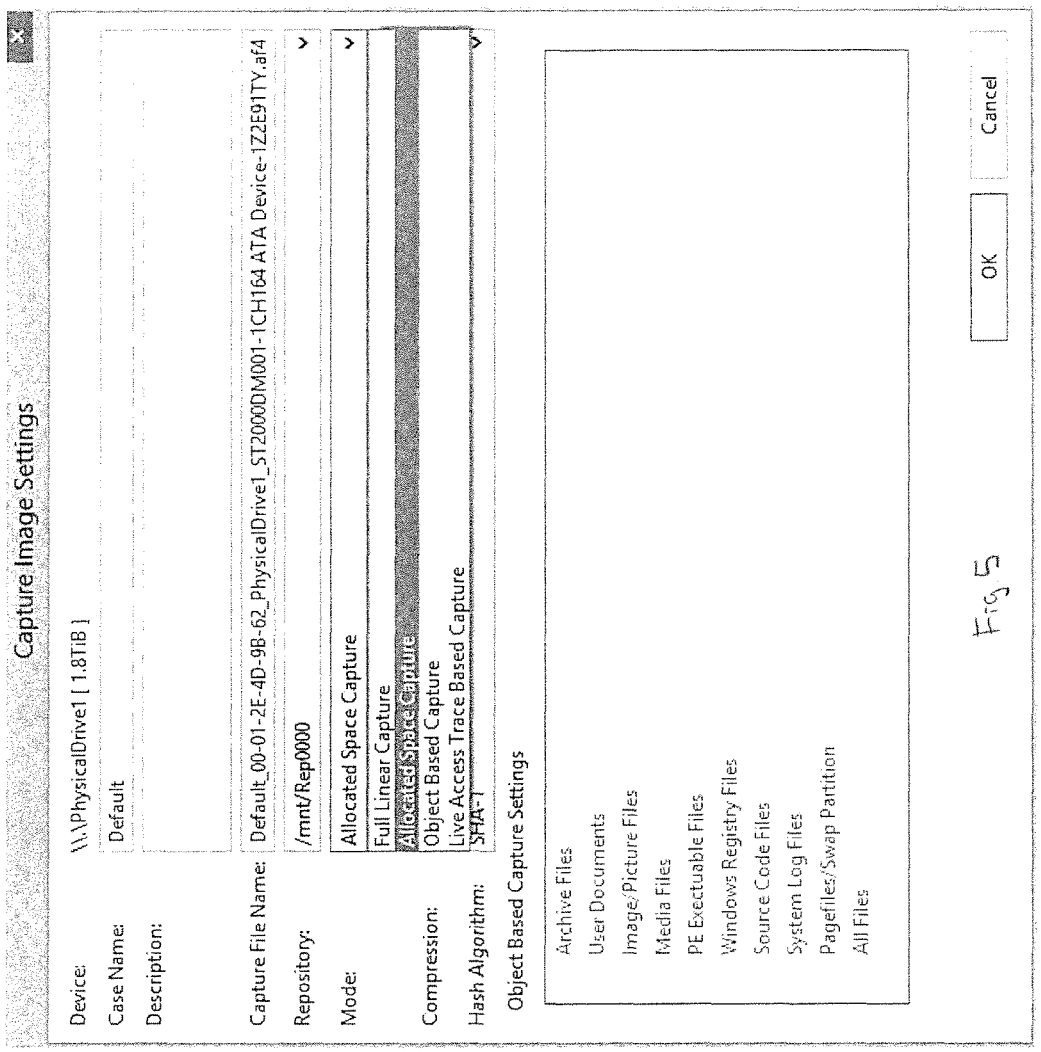
FIG. 5 is a screen capture of a portion of the Controller of FIG. 3 for allowing a user to specify the scope of the forensic acquisition, and start the acquisition.

FIG. 3 depicts the interactions related to the starting of an acquisition and the ongoing execution of the Scheduler 728 and Interpreter 729. All goals which have been streamed in step 722 to the Interpreter, are stored in the Query-Action rule map 723. On receipt of a start message, the Interpreter's Current Object Set 720 is primed in step 721 with the Target Data Repository Object (FIG. 11, reference 740) (in this case the hard drive of the target computer). At steps 724, each object in the Current Object Set is tested against each Query 708 in the Query-Action rule map. For each match, the object is applied in step 725 to the Action 709 that corresponds to the query. If the Action is a Task, the effects of the actions of the Task may include adding in step 726 Region Read Requests to the Scheduler (and onwards the Pending Read Queue), and on completion, the Task may return a number of Objects in step 727 to the Current Object Set. If the action is an Event, no scheduling related activities occur.

In the above example, no objects would exist in the interpreter to match any of the Object Match Queries specified by the investigator. However, with reference to FIG. 11, one of the default rule queries, the Image Query) 730, would match the Target Data Repository Object 740 and the associated LVMVolumeTask 731 and MBRVolumeTask 732 activated. The activation of these tasks would cause the submission of a set of data block Region Read Requests to be sent to the Scheduler (with a normal Priority Tag), where the requests would be scheduled, the reads undertaken based on the scheduling order, and the resulting data blocks passed back to the LVMVolumeTask 731 and MBRVolumeTask 732. In the current example windows based computer, the LVMVolumeTask 731 would fail (as it is for interpreting a Linux specific partitioning scheme), however the MBRVolumeTask 732 would succeed, and identify the bounds of a partition (volume) on the target disk. The MBRVolumeTask 732 would then create an object representing the volume found (an NTFS Volume Object 733) and cause it to be placed into the Interpreter Current Object Set.

Figure 11:
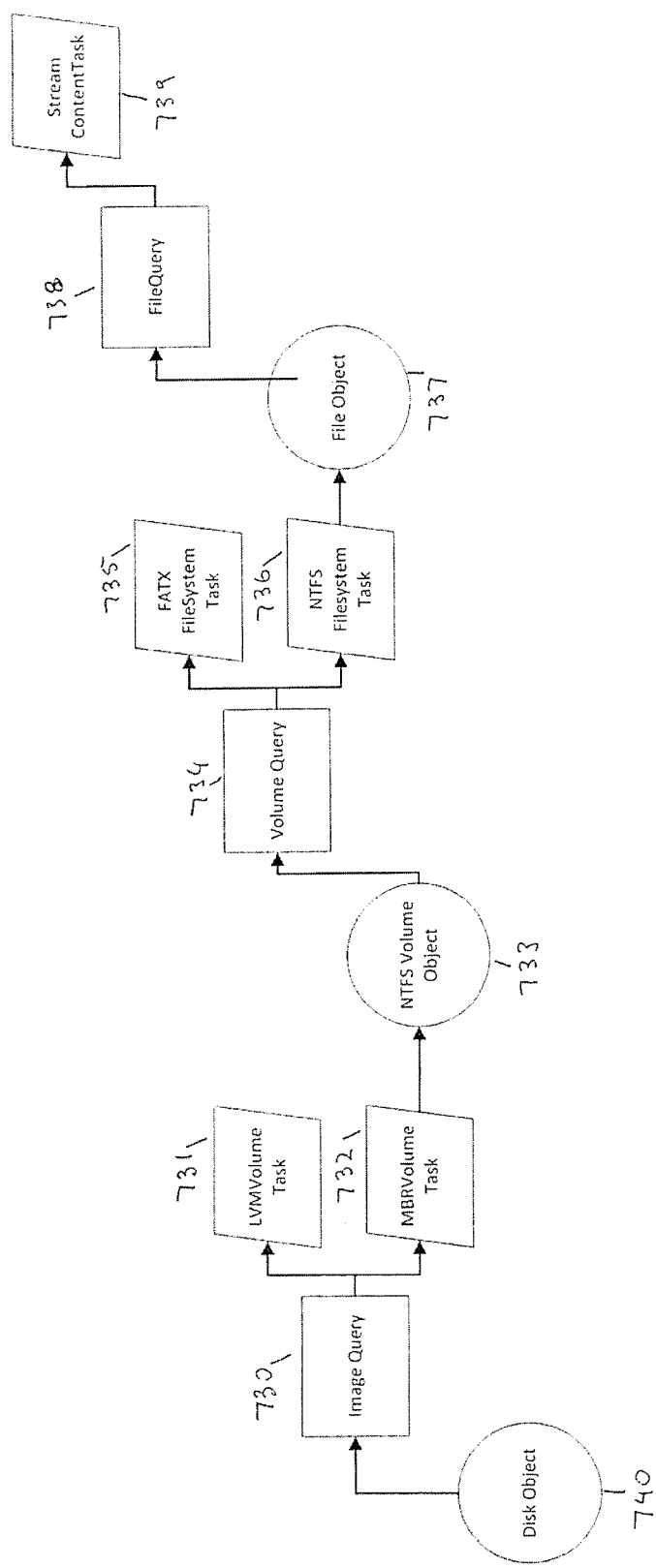
FIG. 11 is a flow diagram illustrating an exemplary use of an embodiment of the present invention.

Still referring to FIG. 11, the interpreter would then match the NTFS Volume Object 733 to the Volume Query 734, and the associated FATXFileSystemTask 735 and NTFSFileSystemTask 736 activated. The activation of these tasks would cause the submission of a set of data block Region Read Requests to be sent to the Scheduler (with a normal Priority Tag), where the requests would be scheduled, the reads undertaken based on the scheduling order, and the resulting data blocks passed back to the FATXFileSystemTask 735 and NTFSFileSystemTask 736. In the current example windows based computer, the FATXFileSystemTask 735 would fail (as it is attempting to interpret an NTFS filesystem with a FAT filesystem implementation), however the NTFSFileSystemTask 736 would succeed, and in its operation would have identified all of the files, and the location of the file content, on the disk. The NTFSFileSystemTask 736 would create and give to the interpreter a File Object 737 representing each file it found.

With reference to FIG. 11, in a similar manner the interpreter would apply each of the Object Match Queries related to the acquisition scope (being system logs, registry and swapfile), and where the File Object 737 matches the corresponding File Object Match Query 738 from the acquisition scope, and a resulting Stream Content Task 739 would be undertaken, which would cause Region Read Requests to be sent to the scheduler for the disk blocks underlying the file content. The scheduler would begin scheduling reads of those disk blocks.

The above example describes specifically how Objects resulting from Tasks are in turn applied to Queries by the Interpreter, which causes further Actions such that high level Goals may be satisfied by successive action of low level goals, their associated actions and chain onwards. In an embodiment of the present invention, default queries and related actions exist for: matching storage devices and identifying volumes (partitions) in Master Boot Record (MBR), GUID Partition Table (GPT), and Logical Volume Manager (LVM) formatted storage; matching partitions and volumes and identifying files in filesystems within those volumes, including the MS Windows New Technology File System (NTFS), the MSDOS File Allocation Table (FAT) Filesystem, and Linux Extended Filesystem (EXT3 and EXT4); and matching files and identifying data content (streams) in files in files found on the above filesystems.

A reader versed in the art would recognise that the above lists of implemented Queries and Tasks could be easily expanded to support new volume management schemes, virtual address spaces, filesystems and application data file formats amongst other activities.

The action of the Scheduler in the above example, when applied to a spinning disk hard drive, is to schedule Read Requests based on the address of block to be read. In this way, if the content of two files A and B are stored on disk such that all of B's disk blocks immediately follow all of A's blocks, and the Region Read Requests of B are added to the Scheduler before those of A, the order of reading will be scheduled (re-ordered) such that A's blocks are read in order and then B's blocks are read in order. This prevents the introduction of latency that would occur if the blocks were read out of order.

Orthogonal to the scheduler ordering of Region Read Requests based on block address is the Priority Tags scheme which allows sets of Region Read Requests to be read ahead of lower priority sets of Region Read Requests.

Returning to the earlier example, suppose the user chooses to share the image as a virtual disk while the earlier acquisition activities are still underway. On attaching a third party forensic analysis tool to the virtual disk, the tool would generally issue read requests to first identify the partitioning scheme. These requests would cause the Controller to issue Block Match Queries for the relevant blocks with Priority Tags set to Immediate. The queries would be sent to the Sink device, and the sink would attempt to satisfy the queries from the data in the partial image. In this example, the MBR partitioning data would exist in the image as it has been acquired as a consequence of the former steps, so too would the file system metadata which would be queried for and satisfied due to subsequent virtual disk reads.

Recalling that the partial acquisition in this example did not acquire any document file content, if the investigator chooses to view the content of a picture file, the correspondingly generated Block Match Queries would not be satisfied in the first instance by the partial image at the sink. The queries would then be forwarded to the Source, where they would cause the submission of Region Read Requests with Priority Tags of Immediate to the Scheduler. The Region Read Requests would be scheduled ahead of any other reads of a lesser Priority Tag, which would include the ongoing acquisition of logs, swap and registry files.

The following describes in detail an exemplary operation of the scheduler.

Figure 12:
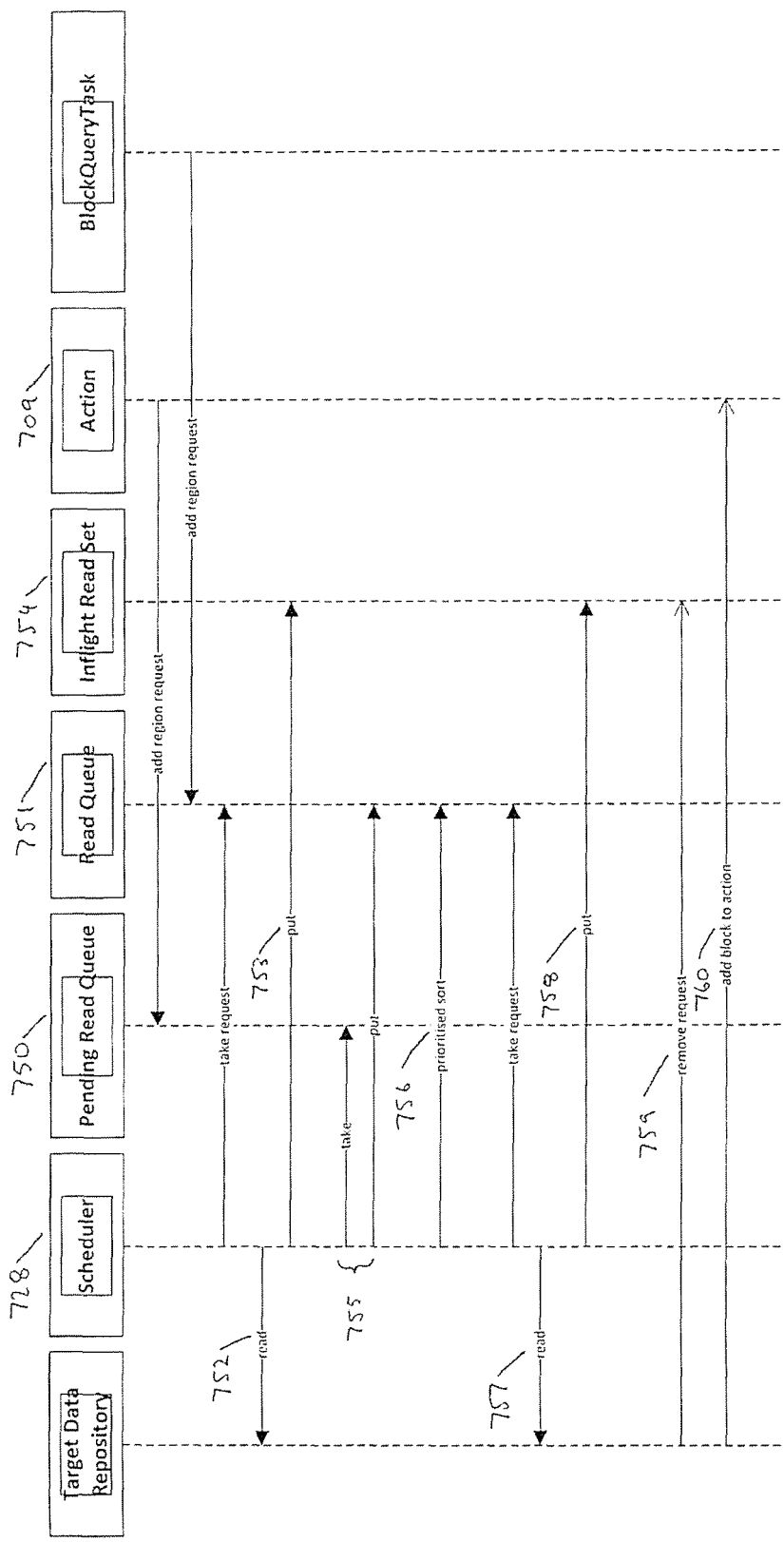
FIG. 12 is a diagrammatic view illustrating an exemplary use of an embodiment of the present invention.

With reference to FIG. 12, the Scheduler 728 operates by considering all Region Read Requests in the Pending Read Queue 750 and the Read Queue 751, which is used for low latency Region Read Requests (i.e. with a Priority Tag of Immediate). Region Read Requests with Immediate priority (low latency) in the Read Queue are scheduled for reading immediately in step 752 and placed in step 753 into the Inflight Read Set 754. When the Read Queue 751 is empty, all requests in the Pending Read Queue 750 are transferred in steps 755 into the Read Queue 751. The Region Read Requests in the Read Queue are ordered (prioritised sort) in step 756 first by Priority Tag then by hard disk block address. Region Read Requests of RAM, in the Read Queue are ordered (prioritised sort) first by Priority Tag, then on a first come first served basis.

Depending on the length of the Read Queue, a limited subset of the Region Read Requests at the head of the Read Queue are scheduled for reading in step 757, and removed from Read Queue and placed in step 758 in the Inflight Read Set 754.

Once reads of the blocks of data associated with Region Read Requests are completed, the corresponding Region Read Request is removed in step 759 from the Inflight Read Set 754 and the Data Block is passed to the Block Transformation Pipeline, and passed to any Actions 709 associated with the corresponding Read Request. Such Tasks, if complete are placed in the Completed Tasks set.

The Tasks generally interpret the read data which they requested and may in turn cause further Region Read Requests to be placed in the Pending Read Queue.

The above process may cause the available RAM of the processor on which the process is running to fill, due to some types of Tasks holding onto memory. Accordingly, a means is required where tasks holding onto too much memory may be cancelled and executed later on when there are more RAM resources available for their operation. The process whereby this is undertaken identifies all Region Read Requests associated with such Tasks and the Requests removed from the Read Queue and placed in the Pending Read Queue. All Region Read Requests corresponding to completed reads for those Tasks are placed in the Pending Read Queue and the memory held by tasks released. This is the least efficient case as it may result in the same blocks being re-read.

Blocks in the block transformation pipeline are acted upon by a separate process. The block processing pipeline is configurable. In a preferred embodiment it may contain a number of phases in including: blocks that have been seen before are not processed. Blocks whose byte content consists of a repetition of a single value (for example hard drive sectors wholly containing the byte 0 are common) are transformed to a Symbolic Data Object. Non symbolic data objects are passed to a data compressor. If the block compresses to a smaller size than the original, a Compressed Data Object is passed onwards, otherwise a Raw Data Object is passed onwards.

As compression occurs in parallel and takes a variable amount of time, data objects may end up in a non-optimal order. The reordering pipeline stage attempts to re-order the blocks such that they are in a local ordering for storage.

Each Data Object is passed to a separate parallel process for hashing with a cryptographic hash. The separate process prevents the hashing process adding latency to processing and maximises bandwidth.

Data Objects are passed (either in memory or via the network) to the associated sink agent.

In some embodiments of the invention (in particular when undertaking Object Based Acquisition, or when performing Analytic Tasks such as file hashing) the acquisition task may consume significant amounts of RAM. Accordingly, the Scheduler/Interpreter periodically calculates the amount of memory consumed by Tasks with reads pending.

When over a certain maxima, the Region Read Requests in the Read Queue are reordered based on the quantity of data remaining to be read per task, in effect prioritising completion of tasks with the smallest outstanding regions requiring to be read. The IO effect of this is to shift to a more random access read pattern until RAM consumption is lowered to under the maxima.

The controller provides for exporting the Partial Forensic Images which it is attached to via a virtual disk. In the preferred embodiment this is provided by the iSCSI protocol. Requests for disk blocks from the iSCSI server implementation are accepted and compared with a local cache.

If the requested block is in the local RAM cache on the controller, the data block is extracted from the cache and sent back via iSCSI.

If the requested block is not in the local cache, a Block Match Query for that block is sent to the corresponding Sink Agent. The Sink Agent compares the Block Match Query with the open corresponding Evidence Container. In the case of the Sink being a Subordinate Sink, this may involve forwarding the Block Match Query to a separate connected Primary Sink. If there exists an Evidence Data Object which matches the query, the evidence Object is read from the container, and formatted into its network representation and sent back to the Controller. If the Block Match Query cannot be satisfied by the Evidence Container, then it is forwarded to the associated Source. On receipt of a matching Evidence Data Object by the Sink, the Object is written to the container, and formatted to network representation and sent back to the Controller. On receipt of a requested Evidence Data Object matching a Block Match Query by the Controller, the Evidence Data Object is placed in the cache, and the originating iSCSI read request caused to fetch the requested block of data from the cache. The cache automatically handles transforming Symbolic Data Objects and Compressed Data Objects into Raw Data Objects such that their original data may be provided.

In the case of partial acquisition, even after the automated acquisition is finished, live examination results in continued evidence preservation for reads of evidence that have not yet occurred.

In a preferred embodiment, the system enables a subset of analysis activities which would typically be undertaken in the lab to be undertaken during acquisition. For example, system 100 (FIG. 1) calculates hashes (MD5, SHA1, and Microsoft Authenticode Portable Executable Hashes for windows executable files) as it acquires, with the trade-off of performance penalties for fragmented files.

Production of regular MD5 and SHA1 hashes involve applying each byte of the file content in sequence to the hash algorithm. At odds with this sequential processing is that in practice blocks of the file may be returned out of order based on efficient IO scheduling. System 100 handles this by defining a Task called a StreamedTask. A streamed task submits Region Read Requests to the Scheduler, the regions of which, when read are passed back to the StreamedTask. The regions may arrive in or out of order. Where regions arrive out of order, copy of the relevant data is made and held by the task until all of the preceding regions have been hashed. Where regions arrive in order, they are hashed immediately, provided the preceding block has been hashed, or that the block is the first block in the file stream. Once a region has been hashed it is released for garbage collection. Once all bytes of the stream have been passed through the hash algorithm, the task is complete, a Hash Value object is constructed and passed down the pipeline to ultimately be stored within the evidence container.

Production of Microsoft Portable Executable (PE) Authenticode hashes involve non-linear IO in the byte stream corresponding to the file content. First the beginning of the file is read, then a data structure at the end of the file is read, and then a hash generated by largely sequentially applying a hash algorithm to a subset of the byte sequence corresponding to the file content. System 100 handles this by defining a Task called a RandomSeekTask. Where regions arrive a copy of the relevant data is made and held by the task until all of the regions associated with the task have been received. Only then is the PE Hashing algorithm applied to the re-assembled byte sequence. All regions are then released for garbage collection. Once all bytes of the stream have been passed through the PE hash algorithm, the task is complete, and the hash value passed down the pipeline to ultimately be stored within the evidence container.

Matching of byte patterns is undertaken using a BlockMatchQuery which matches data blocks in a configurable size (generally 512 or 4096 bytes). When in operation, the query causes blocks of said size to be passed to a MatchingTask, which employs a DFA matching automata to in parallel match patterns of bytes. On successful matching a PatternMatch object containing the offset of the match and the match expression is passed down the pipeline.

In order to create and build a partial and out of order forensic image the Advanced Forensic Format 4 (AFF4) evidence container format is preferably used for achieving this. The Map Stream abstraction of the AFF4 format allows saving of evidence data objects into an AFF4 Image Stream in the order that they arrive (potentially out of order) and maintain a virtual address mapping for their source storage device address. Reads of stored blocks are identified by consulting the in memory Map Stream.

It will be understood that a partial forensic image could of course end up a complete forensic image should acquisition cover all the storage areas of the source storage device.

The extension described below could allow reading from the partial out of order image without access to the in-memory Map, by direct access to the file, but would have efficiency issues.

Potential mishaps during acquisition include power failure of disks, accidental USB storage device removal, and site wide power blackouts. With acquisition activities taking many hours, restarting acquisition after a mishap carries with it significant time penalties.

In one preferred aspect, the invention extends earlier AFF4 work of the inventor by periodically generating a checkpoint, where the container is saved to a consistent state by: (1) evidence containers are constructed such that the first file in the container is a file named container.description and the content is the Volume Identifier (Volume ID) of that evidence container volume; (2) the Map Stream abstraction is utilised for all forensic images, backed by an Image Stream; (3) in a periodic basis, a copy of Map Stream of the current forensic image, and copy of the container metadata information.turtle file are saved within the container; (4) a container End of Central Directory record (utilising the Volume ID in the comment) is generated and flushed to the container file.

After a failure, the most recent checkpointed state is identified by: (1) first scanning from the start of the file to identify a File Header with name container.description; (2) the Volume ID is identified from the content of that file; (3) sequentially reading backwards from the end of the evidence container file and searching for a pattern of bytes that conform to an End of Central Directory record with comment matching the Volume ID from the prior step.

From the checkpointed state the container is then opened, the Map read and from that the extents of blocks requiring further acquisition determined.

Acquisition speed may scale beyond the maximum bandwidth of a single output device by spreading the image across multiple devices, for example to 3 directly attached USB attached storage devices in addition to across two Gigabit Ethernet connections to Ethernet attached destination computers with attached storage devices. Additionally, one may use multiple output IO channels for redundancy.

Using the controller application the operator attaches storage destinations to an acquisition activity, and selects whether the image is to be striped across the output devices for maximal speed or mirrored across devices for redundancy.

For mirrored: an AFF4 Evidence Container is created on each destination storage device; all AFF4 containers are created with a different Volume ID; all such AFF4 containers share a common Container ID; a Map Stream with underlying Image Stream is created in each container, such that the ID's for the Map Streams are the same, and the ID's for the storage streams the same; for each evidence object, the object is stored in the open Map Streams, and accordingly the lower Storage streams; a resumption checkpoint is undertaken on a regular basis.

For striped (maximum throughput): an AFF4 evidence Container is created on each destination storage device; all such containers have a different Volume ID; all such AFF4 containers share a common Container ID; in each such container a uniquely identified storage stream is opened; a Map Stream with underlying Image Stream is created in each container, such that the ID's for the Map Streams are the same, and the ID's for the storage streams the same.

For each evidence object, if the Evidence Object is a Raw Evidence Object or a Compressed Evidence Object, the Evidence Object is written to the Image Stream with the smallest number queued writes (measured in bytes and not objects), and the Map Streams in each container updated to reflect the storage of that Object in that stream. If the Evidence Object is a Symbolic Evidence Object or a Hash Symbolic Evidence Object the evidence object is stored in the Map Streams in each container without writing data to any Image Stream.

A resumption checkpoint is undertaken on a regular basis, writing the Map to all open containers.

In instances where the Source Device has multiple network interfaces, the source is able to employ the available bandwidth over a multitude of network interfaces by establishing protocol connections over a multitude of links as a single aggregated IO channel.

When such encryption is in use, the IO bandwidth over such a link may be limited by the rate at which a single CPU can encrypt a stream of data. In such instances, the protocol provides for maximising bandwidth by either: negotiating the underlying protocol to not use encryption; or negotiating the underlying protocol to use an underlying encryption scheme which is less computationally burdensome; or establishing one or more additional encrypted stream connections such that their aggregate acts as a single aggregated IO channel.

Example of Usage

A company contacts a forensic analyst with the suspicion that an employee has communicated confidential information to a third party without authority, in the weeks leading up to their ceasing employment. The analyst is asked to investigate for any evidence of such communication and is directed to a number of computers which the employee had access to: two potential workstations and two laptops. The analyst is supplied the name "John Smith" and login name of the user "jsmith" as the suspect. All of computers are running the Windows operating system.

The analyst visits the company, and connects two sink devices to the corporate network switch, and two large hard drives to the two sink devices for storage of evidence.

The analyst then takes 4 Compact Disks containing the Source software, places them in the CDROM drives of the destination computers and executes the Source software. The investigator then attaches a laptop computer to the corporate network and executes the Controller, which automatically discovers the Sources and Sinks.

The analyst now acts to preserve the high value evidence from the destination computers. Using the controller, an acquisition session of each destination computer is started, with the acquisition scope including first the RAM of the computer, followed by an initial subset of the hard disks of the destination computer, including the filesystem metadata, the system logs, the windows registries, and page files (swapfiles). The investigator sets the destinations of these acquisition operations such that two acquisition sessions go to each sink device.

Once the acquisition is underway, the analyst proceeds to examine the evidence. The examiner shares the first workstation disk image as a virtual disk on her laptop. Using a forensic tool, the analyst browses the filesystem, looking for the area of the computer where each user's data is generally stored (e.g., the user profile folder). The investigator does not find a profile related to the suspect, and accordingly forms the opinion that the workstation is not relevant.

The examiner then repeats the process, this time against a virtual disk attached to the second workstation image. This time, a browse of the file system reveals a folder named/Users/jsmith/, which is consistent with being the suspect's user profile, and the analyst forms the opinion that the workstation is relevant. After briefly accessing the unallocated storage area of the file system, the analyst decides to preserve the entirety of the hard drive. Using the controller, the analyst modifies the acquisition scope to include the entirety of the hard drive.

The examiner then repeats the process, this time against a virtual disk attached to the first laptop image. Again, a browse of the file system reveals a folder named/Users/jsmith/, and the analyst forms the opinion that the laptop is relevant. After briefly accessing the unallocated storage area of the file system, the analyst decides that the unallocated portion of the hard drive is irrelevant, and chooses to preserve only the entire allocated portion of the hard drive. Using the controller, the analyst modifies the acquisition scope to include the entirety allocated portion of the hard drive.

Finally, the examiner then repeats the process against a virtual disk attached to the second laptop image, and finds the laptop relevant. Using the controller, the analyst modifies the acquisition scope to include the entirety of the allocated portion of the hard drive.

With the fully defined scope of the acquisition defined, the analyst then notices that the second workstation hard drive is particularly large, and will take four more hours to complete than the laptops at the current rate. The analyst forms the opinion that acquisition will proceed faster if an image destination hard drive is directly attached to the workstation computer. A USB3 hard drive is attached to the second workstation computer, and using the controller, the acquisition session is modified to spread the image across the directly attached USB3 hard drive in addition to the original sink destination. The rate at which acquisition proceeds is markedly increased such that the amount of time to completion has been halved.

The analyst then proceeds to continue with other analysis activities (including registry and link file analysis). When the acquisition is completed for the three computers, the analyst ceases sharing the images, finalises the images, shuts down the software and sinks, and returns to the lab with the collected evidence, where further in-depth analysis tasks are undertaken.

From the above, it may be seen that analysis may be conducted concurrently with acquisition, which greatly makes the entire forensic analysis more efficient. For example, the scope of the forensic acquisition can be modified while the acquisition occurs, leading to time efficiencies and/or more targeted (relevant) data acquisition.

The foregoing description is by way of example only, and may be varied considerably without departing from the scope of the present invention.

The features described with respect to one embodiment may be applied to other embodiments, or combined with or interchanged with the features of other embodiments, as appropriate, without departing from the scope of the present invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for simultaneous forensic acquisition and analysis of data from a target data repository, the system comprising:
    a source agent in operative communication with the target data repository, said source agent being configured to read a portion of the target data repository;
    a scheduler configured to schedule reads of the target data repository based on read commands tagged with predetermined priorities and computations based on the result of prior reads;
    an investigator computer having a processor configured to send at least one prioritised read command to said source agent to schedule a read of the target data repository based on a predetermined priority; and
    a data sink configured to store at least a partial forensic image of the target data repository based on the data read by said source agent, said processor being configured to permit reading from the partial forensic image, while the same partial forensic image is being written with data read based on the predetermined priorities by said source agent.

2. The system of claim 1, further comprising a sink agent in operative communication with each of said data sink, said processor, and said source agent, said processor being configured to send the prioritised read command to said sink agent prior to sending the evidence request to said source agent.

3. The system of claim 1, further comprising a sink agent in operative communication with each of said data sink, said processor, and said source agent, said source agent being incapable of writing to the target data repository, and said sink agent being configured to assemble the partial forensic image based on non-sequential data reads from the target data repository.

4. The system of claim 1, wherein the prioritised read command is prioritised based on an amount of allocated memory in the target data repository.

5. The system of claim 1, wherein the prioritised read command specifies the reading of data based on mime type or extension.

6. The system of claim 1, wherein the prioritised read command specifies the reading of data based on based on file objects within a folder hierarchy.

7. The system of claim 1, wherein the prioritised read command is prioritised based on a storage type associated with the target data repository.

8. The system of claim 1, wherein the prioritised read command is prioritised based on an address of data blocks being read.

9. The system of claim 1, wherein said data sink forms part of a remote computer separate from said investigator computer and the target data repository.

10. The system of claim 1, wherein the prioritised read command includes a priority tag and a read command.

11. The system of claim 10, wherein the priority tag is configurable for more than one level.

12. A method for forensically analysing data during a data acquisition from a target data repository, the method comprising:
reading data, with a source agent, from the target data repository to a data sink to assemble a partial forensic image of the target data repository;
submitting at least one prioritised read command to the source agent, the prioritised read command including a read command that is prioritised based on a preconfigured priority;
scheduling, with the source agent, a data read from the target data repository based on the prioritised read command;
reading data, with the source agent, from the target data repository based on the prioritised read command to the data sink; and
permitting analysis of both the data in the partial forensic image and data read by the prioritized read command from the target data repository to the partial forensic image.

13. The method of claim 12, wherein the data is read non-sequentially from the target data repository to the data sink.

14. The method of claim 12, wherein the read command is prioritised based on an amount of allocated memory in the target data repository.

15. The method of claim 12, wherein the read command specifies a block range.

16. The method of claim 12, wherein the read command specifies a file subset.

17. The method of claim 12, wherein the read command is prioritised based on a storage type associated with the target data repository.

18. The method of claim 12, wherein the read command is prioritised based on block address for a target data repository having a spinning disk hard drive.

19. A method for forensically analysing data during a data acquisition from a target data repository, the method comprising:
reading data, with a source agent, from the target data repository to a data sink to assemble a partial forensic image of the target data repository;
scheduling reads of the target data repository based on read commands tagged with predetermined priorities and computations based on the result of prior reads;
submitting at least one prioritized read command to a sink agent operatively connected to the data sink, the prioritised read command, based on the predetermined priorities, specifying a subset of data thought to be contained in the partial forensic image of the target data repository; and
reading, with the sink agent, the subset of data from the data sink if the requested subset of data is in the partial forensic image, otherwise forwarding the prioritised read command to the source agent to obtain the requested subset of data.

20. The method of claim 19, wherein the data is read non-sequentially from the target data repository to the data sink.

* * * * *